United States Patent [19]

Pawlicki et al.

[11] Patent Number: 5,796,862
[45] Date of Patent: Aug. 18, 1998

[54] APPARATUS AND METHOD FOR IDENTIFICATION OF TISSUE REGIONS IN DIGITAL MAMMOGRAPHIC IMAGES

[75] Inventors: Thaddeus Francis Pawlicki, Rochester; Roger Stephen Gaborski, Pittsford; Robert Allen Senn, Rochester, all of N.Y.

[73] Assignee: Eastman Kodak Company, Rochester, N.Y.

[21] Appl. No.: 698,748

[22] Filed: Aug. 16, 1996

[51] Int. Cl.$^6$ ........................................... G06K 9/00
[52] U.S. Cl. ........................................... 382/132; 382/173
[58] Field of Search ........................................... 382/128, 132, 382/173, 199, 205, 224, 225, 266, 298, 299, 300; 128/922

[56] References Cited

U.S. PATENT DOCUMENTS

| | | | |
|---|---|---|---|
| 5,452,367 | 9/1995 | Bick et al. | 382/128 |
| 5,457,754 | 10/1995 | Han et al. | 382/128 |
| 5,481,623 | 1/1996 | Hara | 382/128 |
| 5,572,565 | 11/1996 | Abdel-Mottaleb | 378/37 |

OTHER PUBLICATIONS

International Journal of Pattern Recognition and Artificial Intelligence, Special Issue: State of the Art in Digital Mammographic Image Analysis, Editors, K.W. Bowyer and S. Astley, World Scientific Pub., vol. 7, No. 6, Dec. 1993, pp. 1309–1312.

Digital Mammography, Editors. Gale et al., Elsevier Pub., 1994, pp. 69–78.

Nishikawa et al., "Computer–Aided Detection and Diagnosis of Masses and Clustered Microcalcifications from Digital Mammograms", SPIE–Biomedical Image Processing and Biomedical Visualization, vol. 1905, 1993, pp. 422–432.

F.F. Yin et al., "Computerized Detection of Masses in Digital Mammograms: Analysis of Bilateral–Subtraction Techniques", Med. Phys., vol. 18 (5), Sep./Oct. 1991, pp. 995–963.

K.I. Laws, "Rapid Texture Identification", Proc. SPIE, vol. 238, 1980, pp. 376–380.

J.Y. Hsiao et al., "Supervised Textured Image Segmentation using Feature Smoothing and Probabilistic Relaxation Techniques", IEEE Trans. Pattern Anal. Machine Intell., vol. 11, No. 12, 1989, pp. 1279–1292.

R.O. Duda et al., Patten Classification and Scene Analysis, Wiley Pub., 1973, pp. 217–228.

D.H. Ballard et al., Computer Vision, Prentice Hall Publ, 1982, pp. 155–159.

N.J. Horowitz, et al, "Picture Segmentation by a Directed Split–and–Merge Procedure", Proc. Second International Joint Conference on Pattern Recognition, Aug. 1974, pp. 424–433.

Primary Examiner—Andrew W. Johns
Attorney, Agent, or Firm—William F. Noval

[57] ABSTRACT

A method of identifying tissue regions in a digital image representing a body part provides a digital image representing a body part having tissue regions. The digital image is scaled by subsampling or interpolation, and texture extraction is applied to the scaled image to produce a plurality of texture images each having a different measure of the image texture. The texture images are clustered, and the clustered image is labeled based on both pixel intensity values and geometric adjacency of pixels. A threshold is applied to the labeled image, which is then filtered using a largest component filter system to determine the largest geometrically connected region in the threshold image. The filtered image is subjected to edge detection to produce an edge image containing only edge pixels at high code value, and the edge image is operated on to produce a convex hull image which outlines the skin line of the tissue region of the body part provided in the digital image.

9 Claims, 7 Drawing Sheets

APPARATUS AND METHOD FOR IDENTIFICATION OF TISSUE REGIONS IN DIGITAL MAMMOGRAPHIC IMAGES

FIELD OF INVENTION

The present invention relates in general to digital image processing and more particularly to image processing of digital mammographic medical images.

BACKGROUND OF THE INVENTION

Breast cancer is a leading cause of cancer deaths among women. In Western cultures, it is estimated that one in twelve women will suffer from breast cancer at some time in their lives. Mammographic screening is currently the only effective method of early detection. There has, therefore, been a large amount of research and development in the area of digital image processing and automated image analysis of mammograms. (International Journal of Pattern Recognition and Artificial Intelligence, Special Issue: State of the Art in Digital mammographic Image Analysis, Bowyer, K. W., and Astley, S. Eds. Vol. 7 Num December 1993, World Scientific Pub; Digital Mammography, Gale, et al., Eds. 1994, Elsevier Pub.)

Digital image processing of mammographic images can have several goals. One goal is image enhancement, where the image processing algorithms take a digital image as input and produce an altered or enhanced digital image as output. These images can be optimized for specific viewing conditions or considerations. Another goal is automated image analysis where the image processing algorithms take a digital image as input and produce iconic or non-pictorial information to annotate an image in order to aid in the diagnostic interpretation of the image. This second goal is known as "computer aided diagnosis," and is performed with automated image analysis techniques. For both these applications, as well as others, the breast tissue region shown in a mammogram is of primary importance.

A mammographic image can contain many objects, each of which correspond to a region of the image. These objects and image regions can consist of the breast tissue region, a label containing patient identification information, diagnostic marker indicating the view, background film regions, and foreground regions from scanner edge effects. However, the single most important region in a mammogram is the breast tissue region, because it is the region used for diagnosis. Image enhancement can be optimized for the breast tissue region if it can be identified and segmented from the rest of the image. If a digital mammogram is compressed for efficient storage, the breast tissue region must be compressed with lossless compression techniques in order to maintain the highest possible accuracy while the other regions can be compressed with lossy techniques. Automated image analysis systems, in order to increase accuracy and computational efficiency, will often limit the focus of search to only those regions which correspond to breast tissue.

All of the above mentioned techniques can benefit from a method by which the breast tissue region in a mammogram can be reliably and accurately identified and segmented.

Most of the prior art uses global intensity thresholding techniques in order to segment the breast tissue region of a mammogram. Both Nishikawa, et al. (Computer-aided detection and diagnosis of masses and clustered micro calcifications from digital mammograms. Nishikawa et al., SPIE—Biomedical Image Processing and Biomedical Visualization, Volume 1905, 1993.) and Yin et al. (Computerized detection of masses in digital mammograms: Analysis of bilateral-subtraction techniques," Yin, F. F. et al., Med. Phys., vol. 18, pp. 995–963, 1991.) employ global thresholding in order to initiate segmentation of the breast tissue region. This technique can be sufficient under carefully controlled conditions, when the code values that correspond to the breast region can be estimated beforehand. However, the wider patient-to-patient variations in breast tissue density, hospital-to-hospital variations in radiographic technique, as well as film processor variation and digitizer calibration can contribute to making segmentation based on a global intensity threshold problematic for a system in the field. In addition, it is often the case that non-tissue regions such as the patient information label will be found to have pixel intensities in the same range as that of the breast tissue. Under such circumstances additional steps are required to remove these spurious regions from the image.

Since the skin line in a mammogram is close in density value to the background, it is difficult to get accurate results using simple global thresholding techniques to segment the image. In the cases where simple thresholding techniques (or other measures based on any pixel features) can be used, the resulting edge border is rough. Such techniques can result in mis-classification of many pixels in the image.

It is therefore desirable to provide a means by which the breast tissue region in a mammogram may be segmented using a more reliable indicator than that of a global intensity threshold.

SUMMARY OF THE INVENTION

According to the present invention, there is provided a method based on image texture energy by which breast tissue is reliably distinguished from non-tissue regions. The method includes how this texture information is used in the context of grouping, labeling, component extraction, filtering and convex hull calculations in order to achieve a superior segmentation of the breast tissue region in a computationally efficient manner.

It is therefore an object of the present invention to provide an improved method of image analysis which produces a map image corresponding to the tissue regions of a digital image of a body part such as the breast tissue regions in the digital mammographic image.

According to a feature of the present invention, there is provided a method of identifying tissue regions in a digital image representing a body part comprising the steps of:

providing a digital image representing a body part having tissue regions;

scaling the provided digital image by subsampling or interpolating, to produce a scaled digital image;

texture extracting the scaled digital image by texture extraction system to produce a plurality of texture images having a different measure of image texture of the scaled digital image;

clustering the plurality of texture images by operation of a clustering system to produce a clustered image;

labeling the clustered image by operation of a labeling system based on both pixel intensity values and geometric adjacency of the pixels to produce a labeled image;

thresholding the labeled image by operation of thresholding system to produce a threshold image;

filtering the threshold image by operation of a largest component filter system to produce a largest component image which is the largest geometrically connected region in the threshold image;

edge detecting the largest component image by operation of an edge detection system to produce an edge image containing only edge pixels at high code value; and operating on the edge image by a convex hull calculation system to produce a convex hull image which outlines the skin line of the tissue region of the body part of the provided digital image.

DETAILED DESCRIPTION OF THE INVENTION

Figure 7:
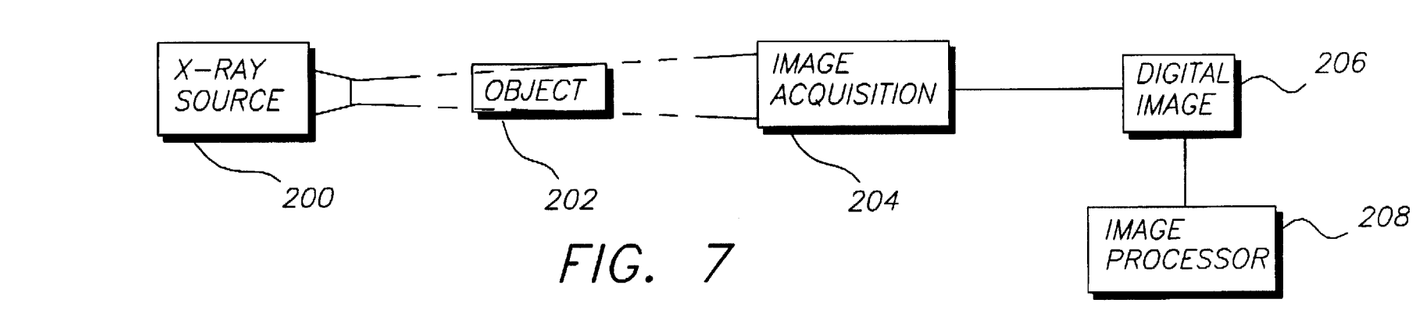
FIG. 7 is a block diagram of a digital image acquisition system.

The method of the present invention operates as a series of operations performed on a digital image of a body part. The digital image can be formed by the digital image acquisition system of FIG. 7. As shown, x-ray source 200 projects x-rays through object 202 (such as a body part, e.g., mammarys) to image acquisition system 204. The image acquisition system can be, for example, (1) a standard x-ray screen/film combination which produces an x-ray film image which is processed chemically or thermally and the processed film digitized by a scanner/digitizer 206; (2) a computed radiography system where a latent x-ray image is formed in a storage phosphor 204 and a corresponding digital image is produced by reading out the storage phosphor by a CR reader 206; and (3) a diagnostic scanner (such as MRI, CT, US, PET) produces an electronic x-ray image which is digitized.

Figure 8:
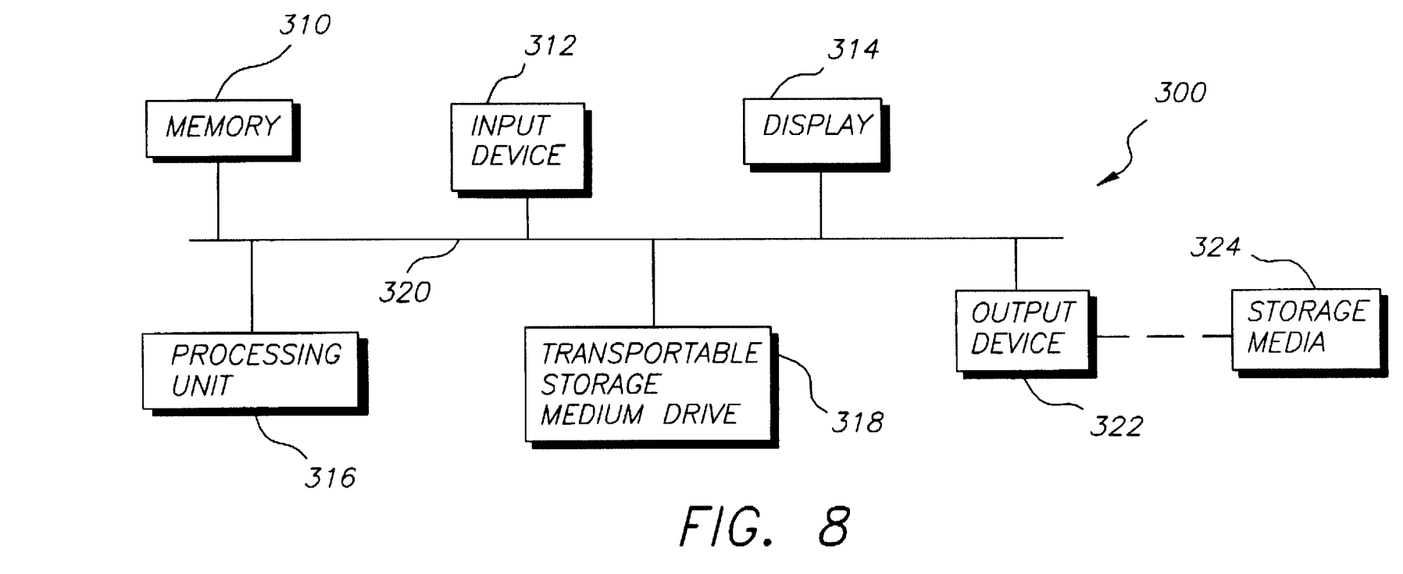
FIG. 8 is a block diagram of an image processor for carrying out the method of the present invention.

The digital image is processed in an image processor 208, according to the method of the present invention. Image processor can take the form of a digital computer, such as illustrated in FIG. 8. In such case, one or more of the steps of said method can be carried out using software routines. Image processor can also include hardware or firmware for carrying out one or more of said method steps. Thus, the steps of the method of the invention can be carried out using software, firmware, and hardware, either alone or in any preferable combination.

As shown in FIG. 8, a digital computer 300 includes a memory 310 for storing digital images, application programs, operating system, etc. Memory 310 can include mass memory (such as a hard magnetic disc or CD ROM), and fast memory, (such as RAM). Computer 300 also includes input device 312 (such as a keyboard, mouse, touch screen), display 314 (CRT monitor, LCD), central processing unit 316 (microprocessor), output device 318 (thermal printer, dot matrix printer, laser printer, ink jet printer). Components 310, 312, 314, 316, and 318 are connected together by control/data bus 320. Computer 300 can include a transportable storage medium drive 322 for reading from and/or writing to transportable storage media 324, such as a floppy magnetic disk or writeable optical compact disk (CD).

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

Figure 1:
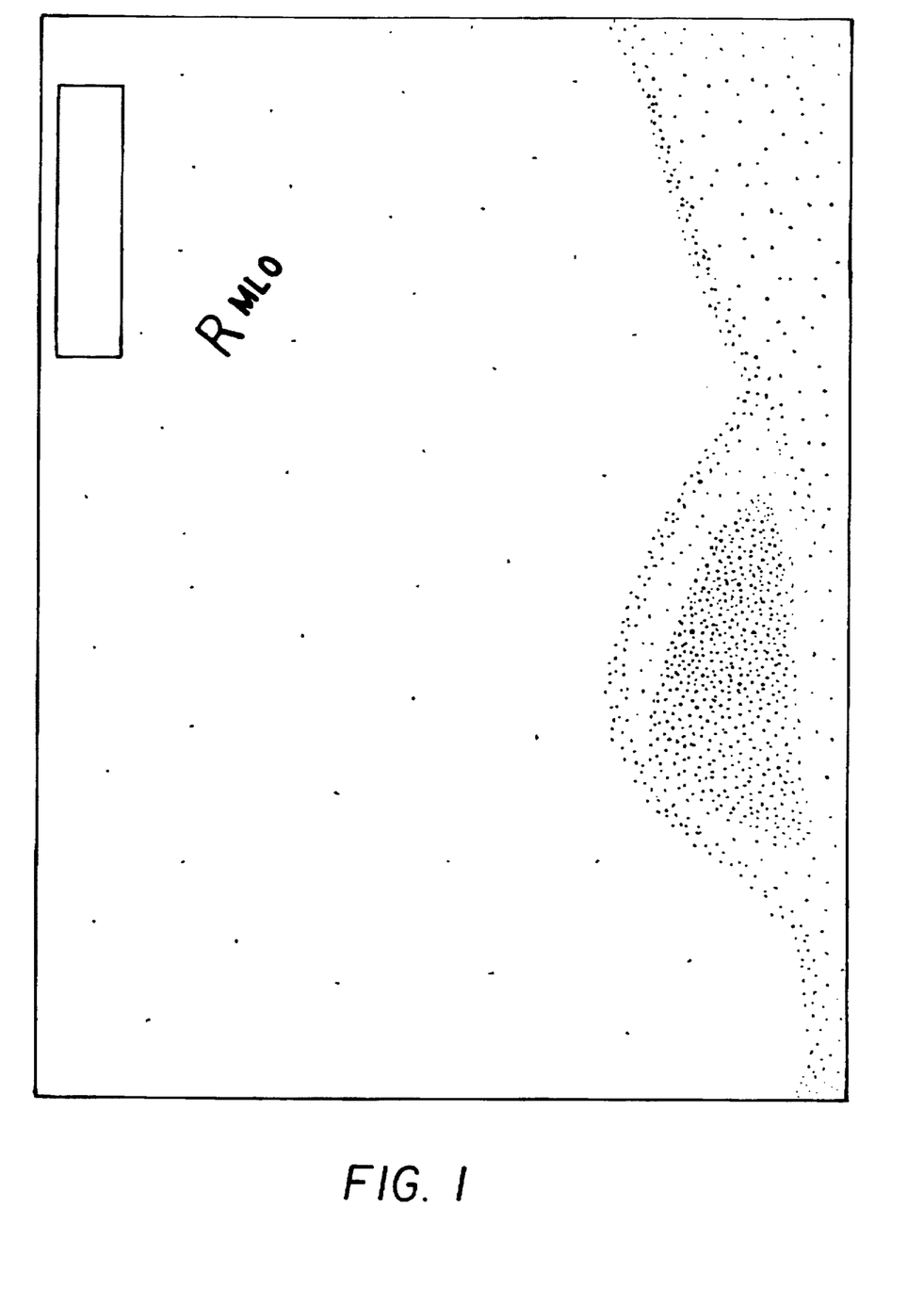
FIG. 1 depicts a mammographic image typical of the type processed by the method of the invention.
Figure 4:
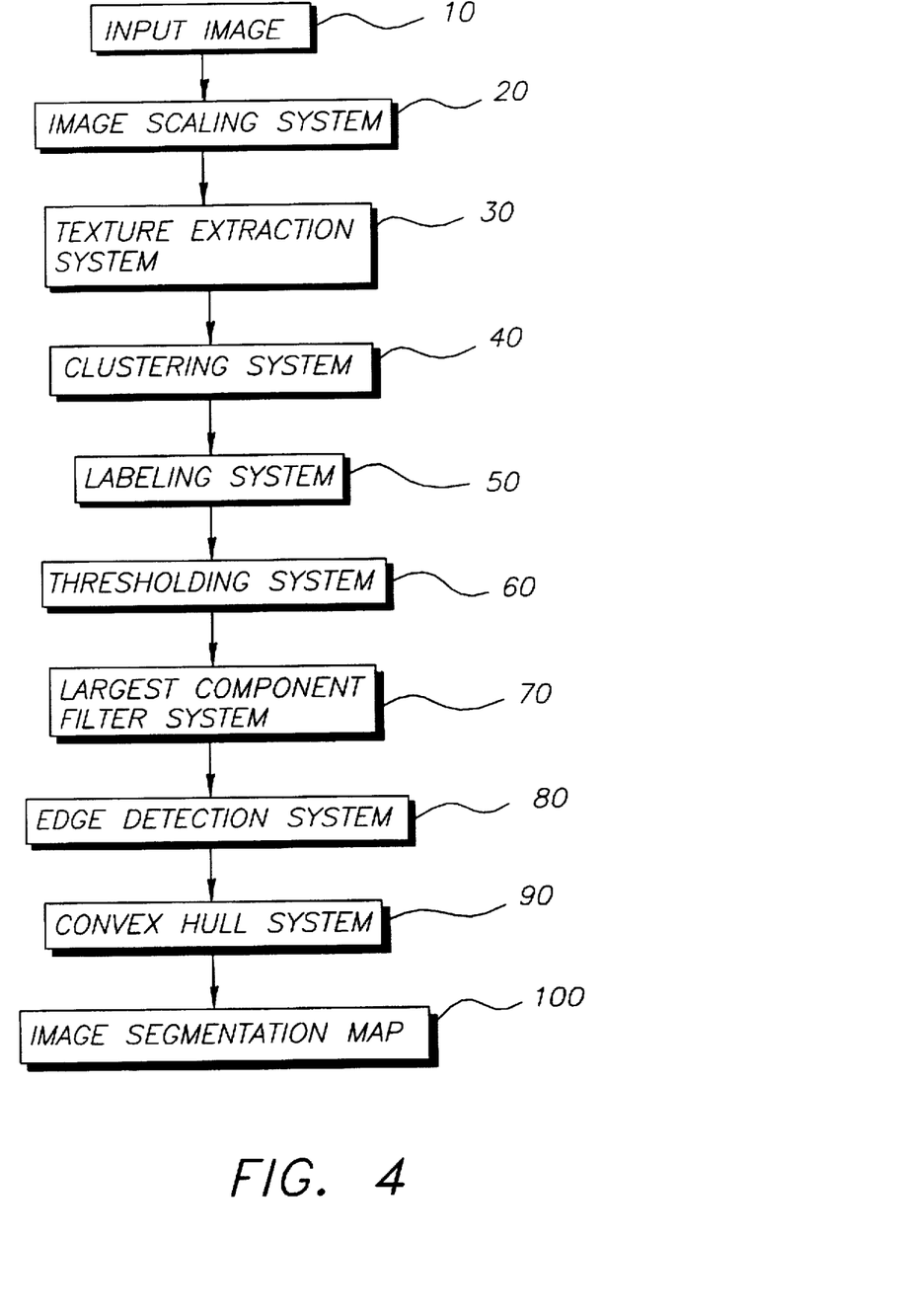
FIG. 4 depicts, in block diagram form, the method of the present invention.
Figure 5:
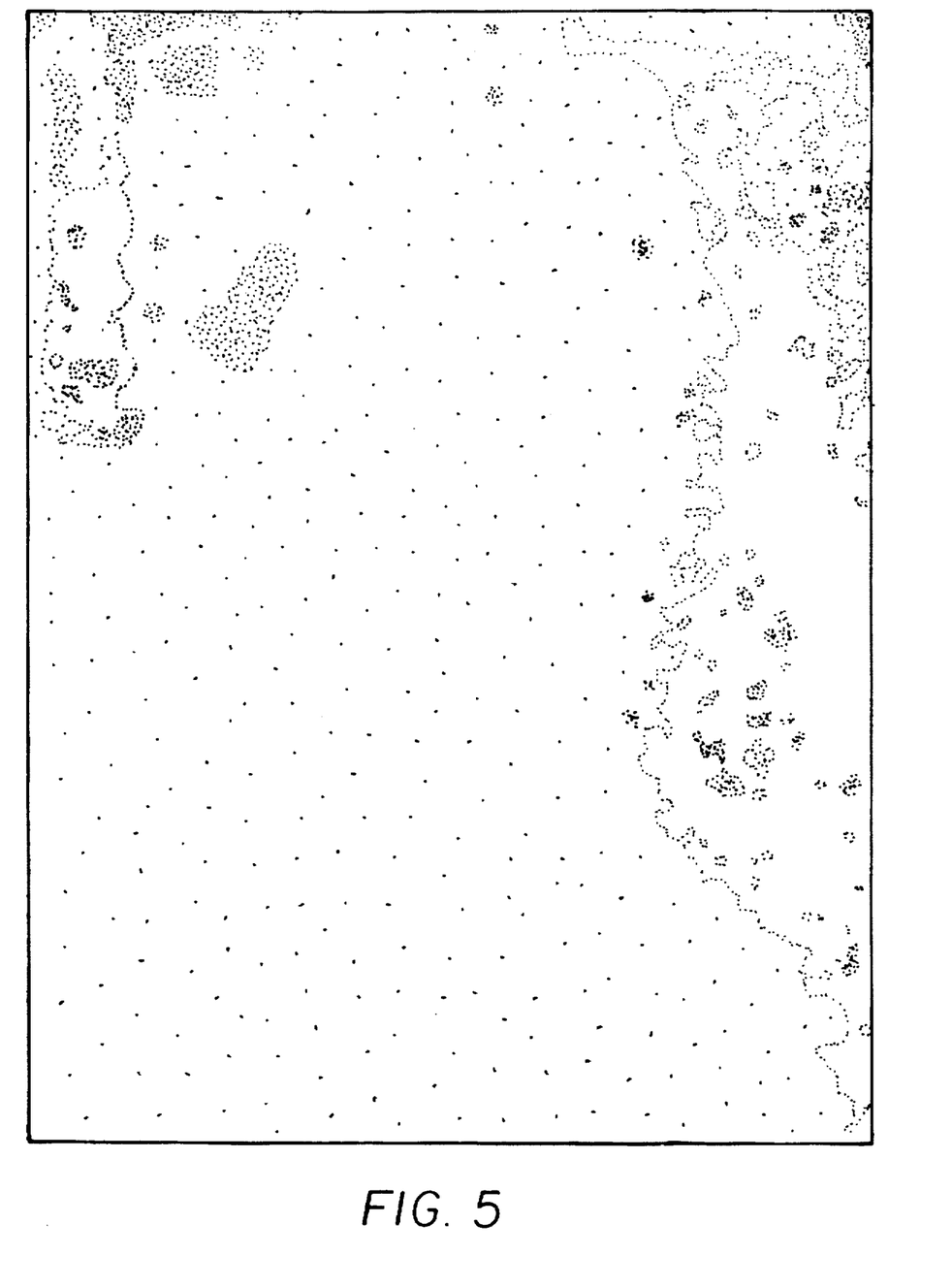
FIG. 5 depicts the result of the labeling step. Noticeable is the fact that the film edge line, clearly visible in FIG. 2, has been eliminated.

The invention operates as a series of operation performed upon the unknown input image 10. FIG. 4 depicts a block diagram of the sequence of operations. It is assumed that this image contains a mammogram typical of the type shown in FIG. 1. It is further assumed that the approximate spatial resolution of this image is known. In the preferred embodiment, mammograms are acquired on standard x-ray screen film combination systems and chemically processed in a standard way. The resulting films are then transformed into a digital representation by a scanner/digitizer. The preferred embodiment uses Kodak mammographic film scanned at approximately 50 micron dot size. However, the technique disclosed herein could also be used on a standard storage phosphor device provided adequate resolution could be achieved. 10 to 12 bits of resolution is regularly employed in the preferred embodiment. It is through methods such as these that the input image 10 is presented as input to the disclosed invention. In the preferred embodiment, this image is approximately 4K×4K pixels in spatial resolution and is represented by 2-byte (16 bits) of gray level data.

The input image 10 is reduced in size by an image scaling system (box 20). In the preferred embodiment, image size is reduced by a process of pixel decimation or by interpolation. It has been demonstrated in practice, however, that simple sub-sampling is a sufficient and often more computationally efficient process. The key consideration at this stage is to match the amount of image size reduction to the spatial resolution of the scanned image and the filter size used in the texture extraction process. Best results are obtained when the relationship between the scan resolution and the filter size is maintained through the adjustment of the size scaling factor.

The scaled image is operated on by a texture extraction system (box 30). A common method of extracting texture information, and the one used in the preferred embodiment is done by convolving the image with a spatial filter. The spatial filters used in the referred embodiment are built from 5×5 kernels derived from center-weighted vectors defined by the laws texture measure. (K. I. Laws, "Rapid texture identification" Proc. SPIE, vol. 238, pp. 376–380, 1980; J. Y.

Hsiao, and A. A. Sawchuk, "Supervised textured image segmentation using feature smoothing and probabilistic relaxation techniques" IEEE Trans. Pattern Anal. Machine Intell., vol. 11, No. 12, pp. 1279–1292, 1989.)

The five center-weighted vectors defined by Laws are:

$L5=|\ 1\ 4\ 6\ 4\ 1|$ $E5=|-1\ -2\ 0\ 2\ 1|$ $S5=|-1\ 0\ 2\ 0\ -1|$ $W5=|-1\ 2\ 0\ -2\ 1|$ $R5=|\ 1\ -4\ 6\ -4\ 1|$

Each 5×5 kernel is derived from multiplying a particular combination of two of the above vectors. This results in 25 possible 5×5 kernels. For example, L5E5 is a 5×5 kernel formed by multiplying the vectors, L5 with E5. While potentially, all 25 kernels can be used, the preferred embodiment uses only the E5E5, S5S5, E5S5, and S5E5 kernels. These four measures appear to provide sufficient discrimination power-for mammograms.

The texture extraction system, therefore, results in a plurality of images. Each image of this plurality corresponds to one of the 5×5 kernels used.

The plurality of texture images is operated on by a clustering system (box 40). The preferred embodiment uses a K-means (R. O. Duda and P. E. Hart, Pattern Classification and Scene Analysis," 1973, Wiley Pub., pp. 217–228.) clustering algorithm to converting the input image into vectors of equal size. The size of each vector is determined by the number of images in the plurality of texture images.

The K-means algorithm is based on the minimization of the sum of the squared distances from all points in a cluster to a cluster center. The referred embodiment operates under the assumption that there will be five initial cluster centers. The image vectors are iteratively distributed among the 5 cluster domains. New cluster centers are computed from these results, such that the sum of the squared distances from all points in a cluster to the new cluster center is minimized. After this clustering has taken place, each pixel in the image is mapped to the value of the cluster center to which it belongs.

The clustered image is operated on by a labeling system (box 50). In the preferred embodiment, the labeling system connects similar regions of the image into contiguous regions through the well known Splitting and Merging algorithm (Ballard, D. H., and Brown, C. M., "Computer Vision." 1982, Prentice Hall Publ. pp. 155–159. Horowitz, N. J., and Pavlidis, "Picture segmentation by a directed split-an-merge procedure," Proc. 2nd IJCPR, August 1974, 424–433.) Care must be taken in the labeling algorithm to ensure that the region with the lowest absolute texture activity and the lowest absolute code value receive the lowest label number. In practice, this presents no problem since the texture information is available from the plurality of texture images and the code value information is available from the original input image. Following this heuristic ensures that the background image region, which is generally free of texture above noise and of low code value (high film density) will be segmented out of the thresholded image.

The labeled image is operated on by a thresholding system (box 60). The thresholding system converts the labeled image, which can have any number of regions. However, because the clustering system has been designed so as to ensure that the region with the lowest absolute texture and the lowest absolute code value receive the lowest label number, a simple thresholding algorithm is sufficient to set the background film pixels to zero and set the remaining regions to a high code value. The resulting image often will have more that one region at high code value, but the breast tissue region will typically be found to be disconnected from these other regions.

The thresholded image is operated on by a largest component filter system (box 70). This system simply labels all the pixels that are spatially adjacent and at high code value with a single unique value. The number of pixels in each region is calculated and only the largest connected component region is maintained. In practice, a morphological open operation can be performed before connected component filtering.

The largest component image is operated on by an edge detection system (box 80). Edges are easily found in a binary image. This step reduces the amount of data necessary for the convex hull algorithm. It is, therefore, an optional step that increases computational efficiency.

The edge image is operated on by a convex hull calculation system (box 90). Many methods for the calculation of a convex hull are known in the literature (F. Perparata and M. Shamos, "Computational Geometry," 1985, Springer-Verlag Publishers, pp. 95–149.)

Figure 2:
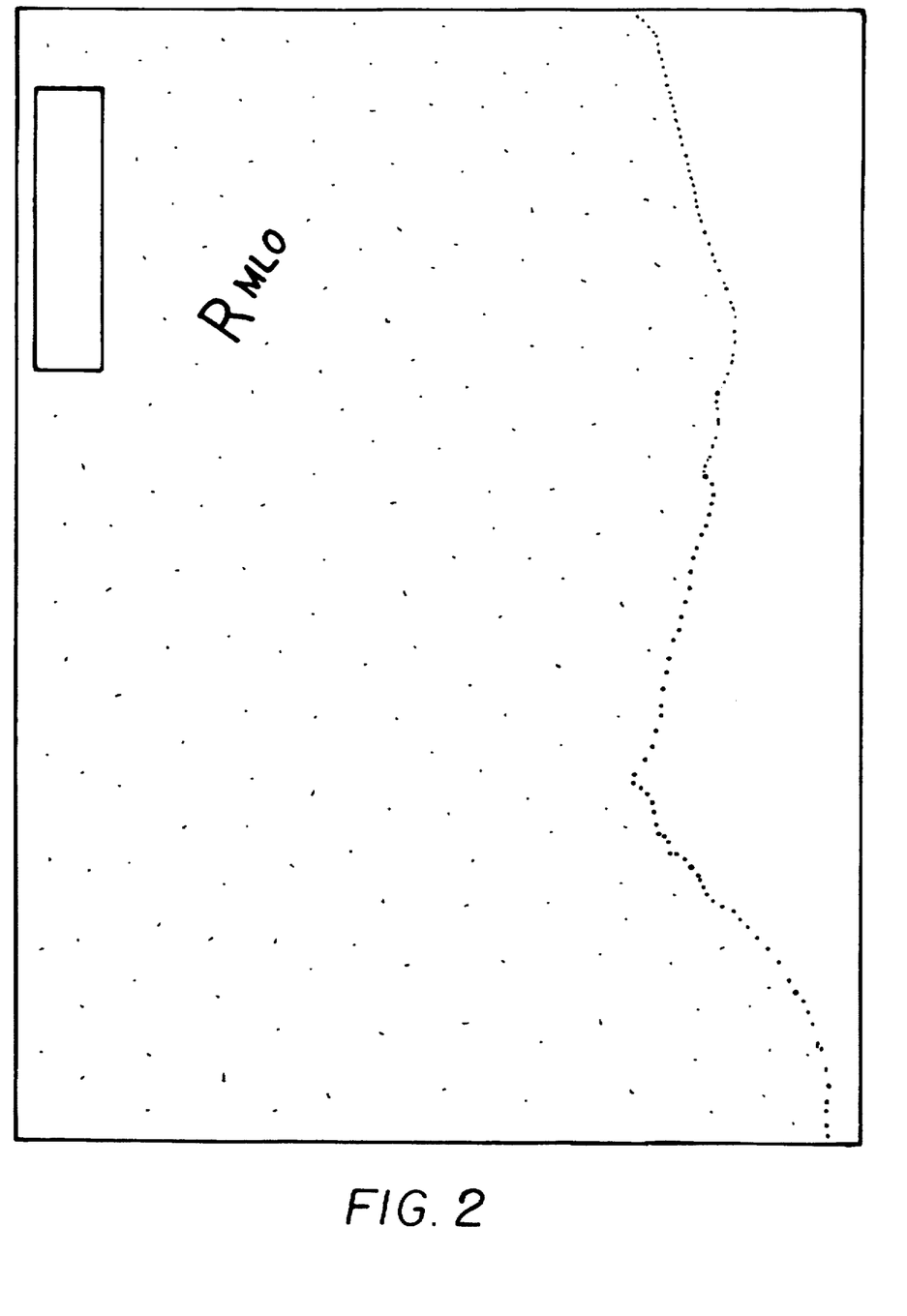
FIG. 2 demonstrates the drawbacks of conventional techniques. It depicts a global thresholding of the image from FIG. 1. Noticeable are the edges of the film area and the view labels. Such spurious, non-tissue regions are difficult to remove using only global pixel intensity thresholding techniques.
Figure 3:
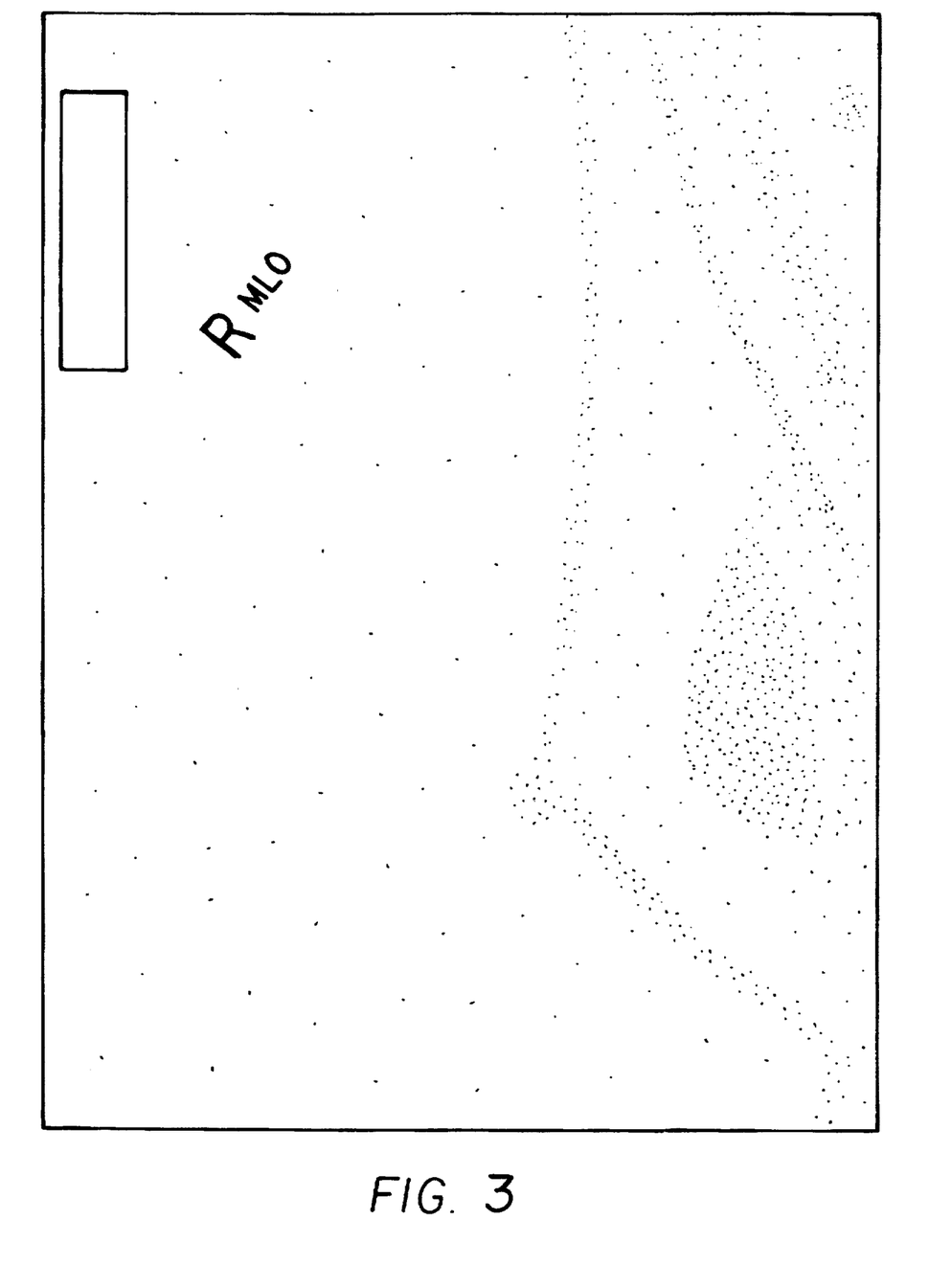
FIG. 3 depicts an artificially enhanced version of the image from FIG. 1. By comparing FIG. 3 and FIG. 2 to FIG. 1, it is noticeable that the true skin line of the breast extends much further than is suggested by the global thresholding technique used to generate FIG. 2.
Figure 6:
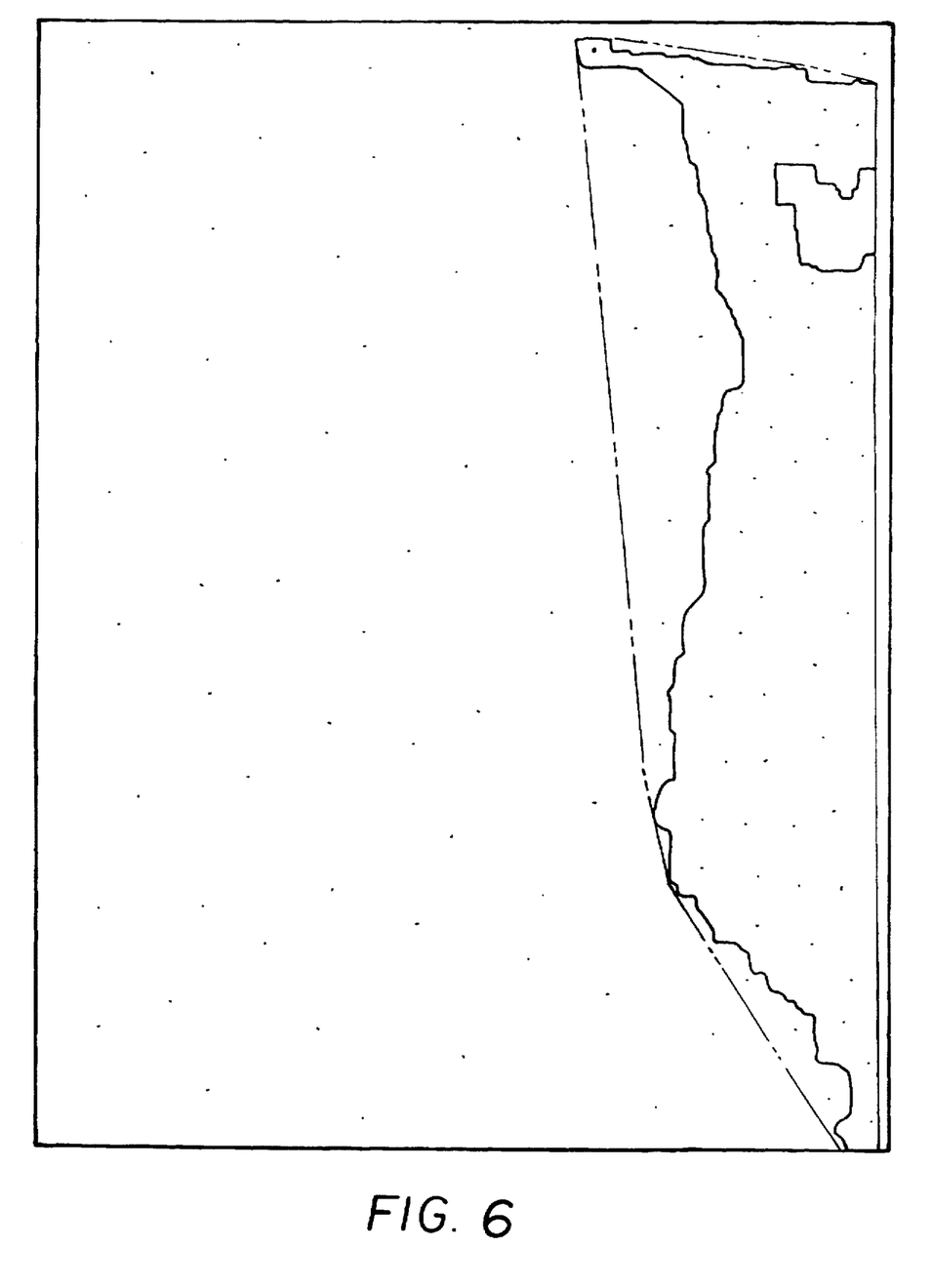
FIG. 6 depicts the result of the convex hull operation. Noticeable is the fact that all spurious regions have been removed. Also noticeable is the fact that the line drawn by the convex hull operation is much closer to the true skin line that the outline of the breast tissue region generated by global thresholding in FIG. 2.

The resulting convex hull is the ultimate output of the invention and can be used in a variety of applications to guide processing to the breast tissue region of a mammographic image through an image segmentation map (box 100). As can be seen from the comparison of FIGS. 2, 3, and 6, the line generated by the convex hull algorithm lies much closer to the true skin line of the breast tissue region than the edge of the thresholded image.

The invention has been described in detail with particular reference to a preferred embodiment thereof, but it will be understood that variations and modifications can be effected within the spirit and scope of the invention.

| Parts List | |
|---|---|
| 10 | input image |
| 20 | input scaling system |
| 30 | texture extraction system |
| 40 | clustering system |
| 50 | labeling system |
| 60 | thresholding system |
| 70 | largest component filtering system |
| 80 | edge detection system |
| 90 | convex hull system |
| 100 | image segmentation map |
| 200 | x-ray source |
| 202 | object |
| 204 | image acquisition system |
| 206 | scanner/digitizer |
| 208 | image processor |
| 300 | digital computer |
| 310 | memory |
| 312 | input device |
| 314 | display |
| 316 | central processing unit |
| 318 | output device |
| 320 | control/data bus |
| 322 | drive |
| 324 | storage media |

What is claimed is:

1. A method of identifying tissue regions in a digital image representing a body part comprising the steps of:

providing a digital image representing a body part having tissue regions;

scaling said provided digital image by subsampling or interpolating, to produce a scaled digital image;

texture extracting said scaled digital image by texture extraction system to produce a plurality of texture images having a different measure of image texture of said scaled digital image;

clustering said plurality of texture images by operation of a clustering system to produce a clustered image;

labeling said clustered image by operation of a labeling system based on both pixel intensity values and geometric adjacency of the pixels to produce a labeled image;

thresholding the labeled image by operation of thresholding system to produce a threshold image;

filtering said threshold image by operation of a largest component filter system to produce a largest component image which is the largest geometrically connected region in said threshold image;

edge detecting said largest component image by operation of an edge detection system to produce an edge image containing only edge pixels at high code value;

operating on said edge image by a convex hull calculation system to produce a convex hull image which outlines the skin line of the tissue region of said body part of said provided digital image.

2. The method of claim 1 wherein the amount of image reduction in said scaling step is matched to the spatial resolution of said provided digital image and the filter size used in said texture extracting step.

3. The method of claim 1 wherein said texture extraction system of said texture extracting step includes convolving said scaled image with a spatial filter.

4. The method of claim 3 wherein said spatial filter uses a 5×5 pixel kernel derived from center-weighted vectors defined by the Laws texture measure, said vectors being

L5=|1 4 6 4 1|

E5=|−1 −2 0 2 1|

S5=|−1 0 2 0 −1|

W5=|−1 2 0 −2 1|

R5=|1 −4 6 −4 1|

5. The metod of claim 4 wherein said spatial filter uses four 5×5 kernels derived from multiplying the following combination of vectors E5E5, S5S5, 3SS5, S5E5, such that each texure image corresponds to one of said four kernels.

6. The method of claim 1 wherein said clustering system of said clustering step uses a K-means clustering algorithm to convert each said texture image into vectors of equal size which is determined by the number of texture images.

7. The method of claim 1 wherein said labeling system of said labeling step connect similar regions of said image into contiguous regions through the splitting and merging algorithm.

8. The method of claim 1 wherein said thresholding step sets the background pixels of said digital image to zero and the remaining region pixels to a high code value.

9. A computer storage product comprising:

a computer readable storage medium having a computer program stored thereon for performing a method of identifying tissue regions in a digital image representing a body part comprising the steps of:

providing a digital image representing a body part having tissue regions;

scaling said provided digital image by subsampling or interpolating, to produce a scaled digital image;

texture extracting said scaled digital image by texture extraction system to produce a plurality of texture images having a different measure of image texture of said scaled digital image;

clustering said plurality of texture images by operation of a clustering system to produce a clustered image;

labeling said clustered image by operation of a labeling system based on both pixel intensity values and geometric adjacency of the pixels to produce a labeled image;

thresholding the labeled image by operation of thresholding system to produce a threshold image;

filtering said threshold image by operation of a largest component filter system to produce a largest component image which is the largest geometrically connected region in said threshold image;

edge detecting said largest component image by operation of an edge detection system to produce an edge image containing only edge pixels at high code value;

operating on said edge image by a convex hull calculation system to produce a convex hull image which outlines the skin line of the tissue region of said body part of said provided digital image.

* * * * *